Patented Feb. 17, 1931

1,793,176

UNITED STATES PATENT OFFICE

JOSEPH KLARER AND FRITZ MIETZSCH, OF ELBERFELD, GERMANY, ASSIGNORS TO WINTHROP CHEMICAL COMPANY, INC., OF NEW YORK, N. Y., A CORPORATION OF NEW YORK

PROCESS OF PREPARING AMINO COMPOUNDS

No Drawing. Application filed March 1, 1929, Serial No. 343,844, and in Germany March 2, 1928.

The present invention relates to the manufacture of amino-alkyl or alkylaminoalkyl compounds.

More particularly it relates to a process of preparing compounds of the general formula

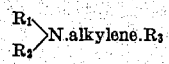

wherein $R_1$ and $R_2$ stand for hydrogen or alkyl radicals and $R_3$ stands for an aryl-, hydroaromatic- or for a heterocyclic residue containing nitrogen, and wherein all nuclei may be substituted.

According to our invention, the compounds of the above formula are prepared by causing a compound of the general formula

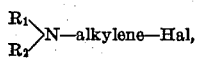

wherein $R_1$ and $R_2$ stand for hydrogen or alkyl radicals and Hal for a halogen atom, to act upon a Grignard compound of the general formula Hal. Mg $R_3$, wherein Hal stands for a halogen atom and $R_3$ stand for an aryl-, hydroaromatic, or heterocyclic residue containing nitrogen, which residues may be substituted. The Grignard compound of the general formula Hal. Mg. $R_3$ is obtainable according to the known process of preparing organo - magnesium - compounds (compare Houben-Weyl, Die Methoden der organischen Chemie, 1924 Vol. IV, pages 777–895).

If desired, the reaction may be carried out in a suitable solvent such as ether and pyridine; sometimes cooling is necessary in the beginning of the reaction. The reaction product is decomposed by pouring on ice; an acid, such as hydrochloric acid, is added to the mixture. From the salt of the amine, the amine is liberated by the addition of alkali and extracted with ether.

The syntheses of the above mentioned aminoalkyl- and alkylaminoalkyl-compounds hitherto employed, leading to analogous compounds, proceed step by step in several phases. The present process, however, enables the desired products to be obtained in a very good yield in a single operation.

The invention is capable of a wide application and is illustrated by the following examples:—

*Example 1.*—β-diethylaminoethylbenzene of the formula

is prepared as follows: An ethereal Grignard solution is prepared in the customary manner from 32 grams of bromobenzene with 6 grams of magnesium. Into this solution, 13 grams of diethylaminoethyl chloride are caused to drop with cooling. When the brisk reaction is complete, heating is effected for half an hour, the reaction product is poured on ice, the mixture is acidified with hydrochloric acid, rendered alkaline and extracted with ether. The amine distils at 100° C. under 10 mm. pressure.

*Example 2.*—Gamma-diethylaminopropylbenzene of the formula

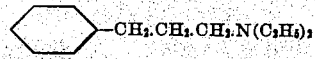

is prepared as follows: 65 grams of benzylchloride are brought into reaction in ethereal solution with 20 grams of magnesium, and 40 grams of diethylaminoethylchloride are dropped into the reaction mixture with cooling. The reaction mixture is worked up as in Example 1. The gamma-diethylaminopropylbenzene boils at 117° C. under 10 mm. pressure.

*Example 3.*—Delta-diethylaminobutylbenzene of the formula

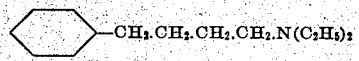

is prepared from phenylethylbromide and diethylaminoethyl chloride; it boils at 132° C. under 10 mm. pressure.

*Example 4.*—30 grams of diethylaminoethylchloride are caused to drop into the Grignard solution formed from 52 grams of 4-bromo-anisol and 10 grams of magnesium. 4-methoxy-1-β-diethylaminoethylbenzene, separated from the reaction mixture, of the formula

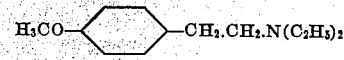

boils at 140° C. under 10 mm. pressure.

*Example 5.*—When diethylaminoethylchloride is caused to act on the mono-magnesium compound of 1:4-dibromobenzene in the manner described above, there is obtained 4-bromo-1-β-diethylaminoethyl benzene of the formula

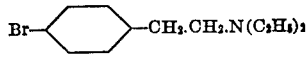

which boils at 140° C. under 10 mm. pressure.

*Example 6.*—2-methylindole-3-magnesium iodide is prepared from one molecule of 2-methylindole and one molecule of magnesium ethyliodide in ethereal solution with the splitting off of ethane. The reaction is completed by evaporation of the ether and subsequent heating on the water bath. Diethylaminoethyl chloride is now added and heating is effected for several hours; on decomposition with hydrochloric acid, a mixture of bases of varying strengths is obtained, of which the weak bases, which do not contain the aliphatically bound amino group, that means especially methlyinodoles and its decomposition products, are extracted from the acid solution with ether and benzene, while the strong bases, the desired 2-methyl-3-β-diethylaminoethylindole of the formula

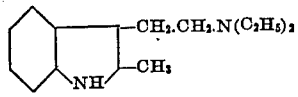

and a little diethylaminoethyl chloride, remain behind in the acid solution. They are set free with potassium carbonate, extracted with ether and distilled. The desired amine boils at 171° C. under 2 mm. pressure and is a colorless, viscous oil, which, on manipulating in the presence of ether, solidifies to form white crystals and no longer possesses the typical indole color.

*Example 7.*—An ethereal solution of anisylmagnesium bromide, prepared from 4 mols of 4-bromo-anisol and magnesium in the usual manner, is slowly introduced into 10 mols of absolutely dry pyridine while cooling in ice. To this solution is added 1 mol of the hydrochloric acid salt of N-monomethylaminoethylchloride, dissolved in pyridine. The reaction mixture is warmed in order to remove the ether and to complete the reaction, for about 2 hours on a water bath to about 70° C. The pyridine is distilled off by means of steam, and the 4-methoxy-1-β-methylaminoethylbenzene of the formula

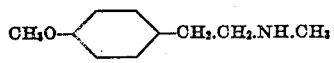

is isolated in the same manner as described in Example 1 and is obtained as a thin liquid oil of the boiling point 112° C. under a pressure of 11 mm.

*Example 8.*—1 mol of absolutely dry beta-aminoethylbromide (hydrobromic acid salt) is added in small portions to an ethereal solution of 5 mols of phenyl-magnesium-bromide. After the brisk reaction has finished, the reaction mixture is decomposed with ice and hydrochloric acid. Those parts of the reaction mixture which do not show a basic reaction, are removed by extracting with ether, and the residue is rendered strongly alkaline by the addition of ammonia; from the ammonical solution the base of the formula

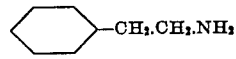

is extracted with ether. It has a boiling point of 92° C. under a pressure of 12 mm.

We claim:—

1. The process which comprises reacting with a compound of the general formula

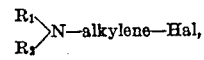

wherein $R_1$ and $R_2$ stand for substituents of the group consisting of hydrogen and alkyl and Hal stands for a halogen atom, upon a compound of the general formula $Hal.Mg.R_3$, wherein Hal stands for a halogen atom and $R_3$ stands for a substituent of the group consisting of aryl- and hydroaromatic residues and heterocyclic residues containing nitrogen, and decomposing the reaction product with water.

2. The process which comprises reacting with a compound of the general formula

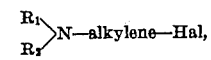

wherein $R_1$ and $R_2$ stand for alkyl groups and Hal stands for a halogen atom, upon a compound of the general formula $Hal.Mg.R_3$, wherein Hal stands for a halogen atom and $R_3$ stands for a heterocyclic residue containing residue, and decomposing the reaction product with water.

3. The process which comprises reacting with a compound of the general formula

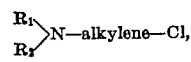

wherein $R_1$ and $R_2$ stand for alkyl groups, upon a compound of the general formula $R_3.Mg.I$, wherein $R_3$ stands for a heterocyclic residue containing nitrogen, and decomposing the reaction product with water.

4. The process which comprises reacting with diethylaminoethylchloride upon 2-methyl-indol-magnesium iodide of the formula

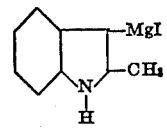

and decomposing the reaction product with water.

5. As a new product the compound of the following formula
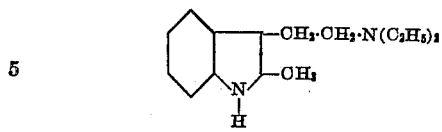
being a colorless viscous oil of the boiling point 171° C. under a pressure of 3 mm. solidifying to form white crystals.
In testimony whereof we have hereunto set our hands.
JOSEPH KLARER. [L. S.]
FRITZ MIETZSCH. [L. S.]